US008248973B2

(12) United States Patent
Chiu (10) Patent No.: US 8,248,973 B2
(45) Date of Patent: Aug. 21, 2012

(54) METHOD FOR OPERATION OF SYNCHRONOUS HARQ IN A WIRELESS COMMUNICATION SYSTEM

(75) Inventor: Chun-Yuan Chiu, Pingtung (TW)

(73) Assignee: Industrial Technology Research Institute, Hsinchu (TW)

( * ) Notice: Subject to any disclaimer, the term of this patent is extended or adjusted under 35 U.S.C. 154(b) by 629 days.

(21) Appl. No.: 12/112,304

(22) Filed: Apr. 30, 2008

(65) Prior Publication Data

US 2009/0323564 A1     Dec. 31, 2009

(51) Int. Cl.
*H04J 3/00* (2006.01)
*H04B 7/00* (2006.01)

(52) U.S. Cl. ........ 370/280; 370/310; 370/444; 370/322; 370/320; 370/328; 455/451; 455/512; 455/452.2

(58) Field of Classification Search .......... 370/280, 370/310, 444, 322, 320, 328, 342, 395.4, 370/392, 508, 241, 329, 345, 337; 455/451, 455/512, 452.2
See application file for complete search history.

(56) References Cited

U.S. PATENT DOCUMENTS

| 6,590,883 | B1 * | 7/2003 | Kitade et al. .......... 370/337 |
| 7,088,688 | B2 * | 8/2006 | Kim et al. .......... 370/280 |
| 7,471,693 | B2 * | 12/2008 | Petrovic et al. .......... 370/444 |
| 2005/0201319 | A1 | 9/2005 | Lee et al. |
| 2005/0201325 | A1 | 9/2005 | Kang et al. |
| 2007/0259672 | A1 * | 11/2007 | Heo et al. .......... 455/452.2 |
| 2008/0137564 | A1 * | 6/2008 | Herrmann .......... 370/310 |
| 2008/0181175 | A1 * | 7/2008 | Lee et al. .......... 370/329 |

OTHER PUBLICATIONS

3GPP TSG RAN WG1 Meeting #50, R1-073533; HARQ RTT and Processes Number In TDD; Athens, Greece, Aug. 20-24, 2007; pp. 1-7.
3GPP TSG-RAN WG2 #55, R2-062932; Proposals on the synchronous HARQ in LTE TDD; Seoul, Korea, Oct. 9-13, 2006; pp. 1-5.
3GPP TS 36.300 V8.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); pp. 1-126, dated Mar. 2008.

* cited by examiner

*Primary Examiner* — Michael Thier
*Assistant Examiner* — Jamal Javaid
(74) *Attorney, Agent, or Firm* — Finnegan, Henderson, Farabow, Garrett & Dunner, LLP (57) ABSTRACT

A method of operating synchronous Hybrid Automatic Repeat Request (HARQ) between a transmitting station and a receiving station in a Time-Division Duplex (TDD) communication system includes configuring, at the transmitting station, a plurality of HARQ processes; transmitting data packets to the receiving station using the plurality of HARQ processes, wherein the data packets do not include HARQ process identification information; receiving, from the receiving station, a plurality of HARQ feedback packets indicative of whether the data packets were correctly received at the receiving station, wherein the plurality of HARQ feedback packets do not include HARQ process identification information and wherein the plurality of HARQ feedback packets are received in a downlink slot; and mapping, by the transmitting station, the plurality of HARQ feedback packets to the plurality of HARQ processes.

12 Claims, 11 Drawing Sheets

METHOD FOR OPERATION OF SYNCHRONOUS HARQ IN A WIRELESS COMMUNICATION SYSTEM

TECHNICAL FIELD

The present disclosure relates to the field of wireless communications and, more particularly, to systems and methods for performing synchronous HARQ in a wireless communication system.

BACKGROUND

Wireless communication systems allow wireless devices to communicate without the necessity of wired connections. Because wireless systems have become highly integrated into daily life, there is a growing demand for wireless communication systems that support multimedia services such as speech, audio, video, file and web downloading, and the like. To support these multimedia services for wireless devices, various wireless communication protocols have been developed to accommodate the growing demands of multimedia services over wireless communication networks.

One such protocol is Wideband Code Division Multiple Access (W-CDMA), which is promulgated by the 3rd Generation Partnership Project (3GPP™), a collaboration of numerous standards development organizations. W-CDMA is a wideband spread-spectrum mobile air interface that uses a direct sequence Code Division Multiple Access (CDMA).

In some embodiments, W-CDMA may support Universal Mobile Telecommunications Systems (UMTS). A UMTS communication system may provide telephony and bearer services in connectionless and connection-oriented communication networks, offering both Point-to-Point (P2P) and Point-to-Multipoint (P2MP) communication. In some UMTS communication systems, the air interface access method may be based on Universal Terrestrial Radio Access Networks (UTRAN), also called UMTS Terrestrial Radio Access Network (also referred to as UTRAN), or Evolved UTRAN (E-TRAN), also referred to as Long Term Evolution (LTE).

Wireless communication systems typically operate either in Frequency Division Duplex (FDD) or Time Division Duplex (TDD) mode. In a FDD system, uplink transmission and downlink transmission operate on different channels, or different frequencies, and wireless devices operating in such a FDD system can transmit and receive simultaneously. In a TDD wireless communication system, however, uplink transmission and downlink transmissions may take place over the same communication channel by physically taking turns in the channel. In some systems, such as an upcoming 4G wireless system, TDD is advantageous because asymmetrical data exchange can be supported more efficiently. For example, a spectrum utilization rate can be increased in TDD systems when the system is transmitting asymmetrically.

Figure 1:
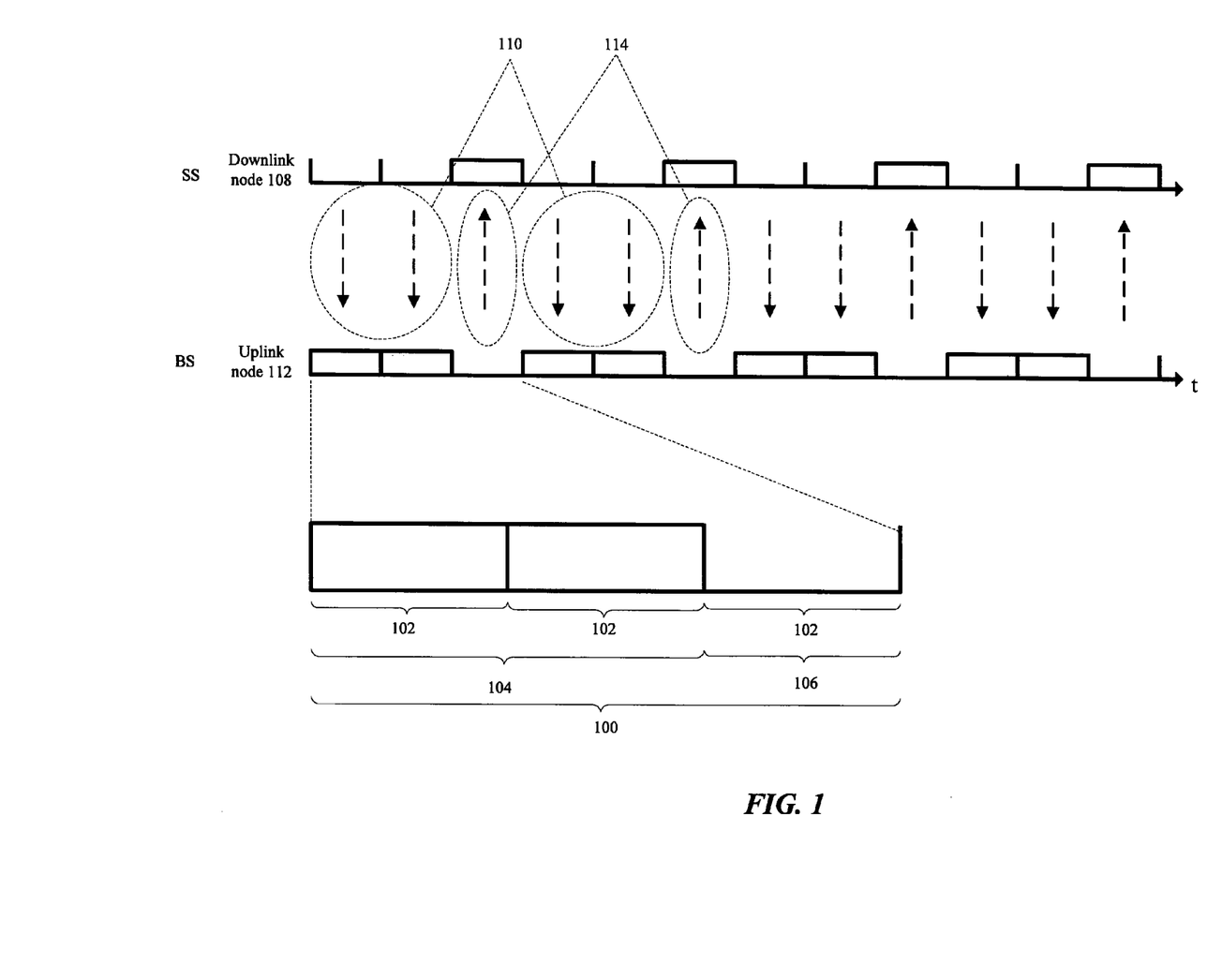
FIG. 1 is a signaling diagram illustrating a prior art TDD frame structure for an exemplary wireless communication system.

FIG. 1 is a signaling diagram illustrating a prior art TDD frame structure for an exemplary wireless communication system. A frame 100 may consist of a plurality of time periods available for a downlink or uplink transmission referred to as Transmission Time Intervals (TTIs) 102. As shown in FIG. 1, frame 100 may include an uplink subframe 104 and a downlink subframe 106. Using uplink subframe 104, a downlink node 108 may transmit uplink transmissions 110 for receipt, for example, at an uplink node 112. During downlink subframe 106, uplink node 112 may transmit downlink transmissions 114 for receipt, for example, at downlink node 108. Uplink subframe 104 and downlink subframe 106 may each include any number of TTIs 102, so the size of frame 100 may vary. In some variations, the structure of frame 100 may be dynamically adapted according to the ratio of uplink data to be transmitted to downlink data to be transmitted.

A radio interface protocol stack for W-CDMA may include support for error detection. Automatic Repeat Request (ARQ) and Hybrid Automatic Repeat Request (HARQ) are two error detection methods used to control errors when transmitting data across a wireless network. In ARQ, a receiver detects frame errors and requests retransmissions. HARQ is a variation of the ARQ error control method in which forward error correction bits are also added to correct frame errors.

In some variations, HARQ can be configured to operate using a Stop-And-Wait (SAW) mode or a Selective Repeat (SR) mode. In SAW mode, a HARQ transmitter must wait for a HARQ feedback packet such as an acknowledgement (ACK) or negative acknowledgement (NACK) from the HARQ receiver before transmitting or retransmitting the next data packet. In some variations, an associated control signal including a 1-bit sequence number may be used to distinguish between new transmissions and retransmissions. During the waiting period for the HARQ feedback packet, the transmission channel may go unused.

A transmitting device, or transmitting station, may include a HARQ transmitting (HARQ Tx) mechanism. Similarly, a receiving device, or receiving station, may include a HARQ receiving (HARQ Rx) mechanism. The HARQ Tx and HARQ Rx mechanisms may be any combination of software and/or hardware components configured to cause the transmitting and/or receiving devices to perform the functions of sending and/or receiving HARQ transmissions. The HARQ Tx and HARQ Rx mechanisms may reside in MAC sublayers of the transmission and receiver devices, respectively.

Figure 2:
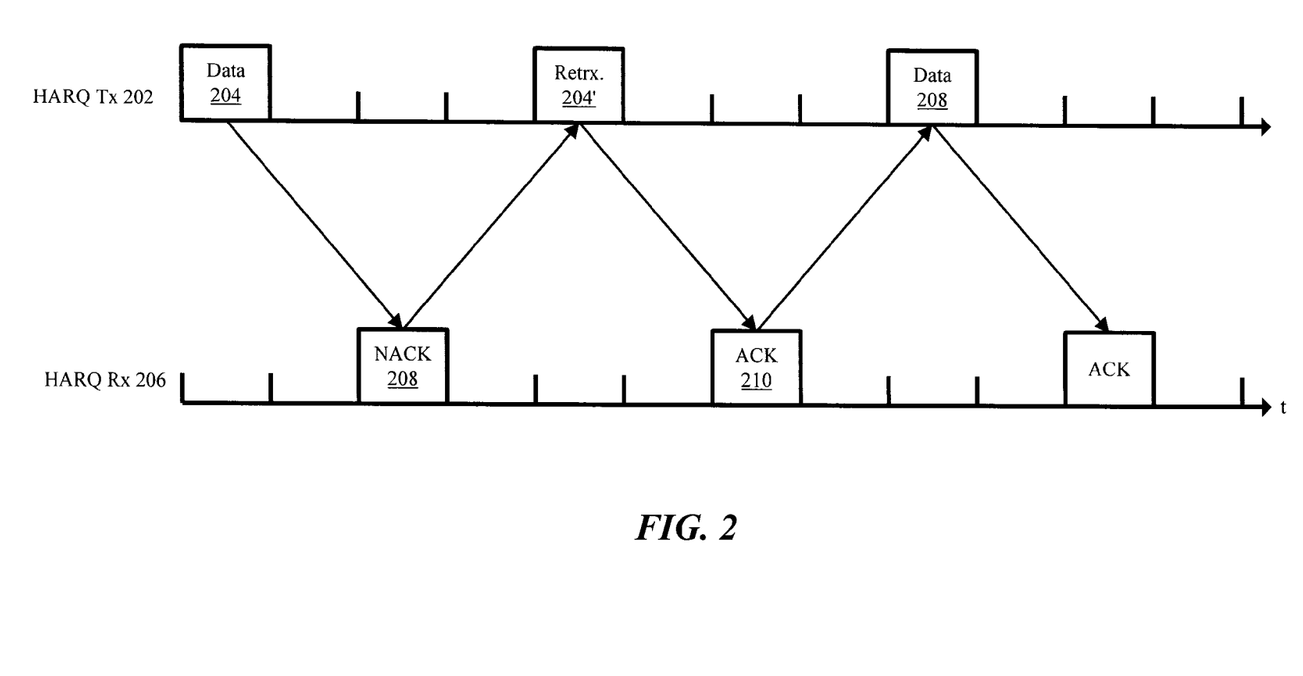
FIG. 2 is a signaling diagram illustrating a prior art transmission using a single HARQ process.

FIG. 2 is a signaling diagram illustrating a prior art transmission using a single HARQ process. In one variation, a HARQ process is an instance of a stop and wait (SAW) protocol, and may be used to control the transmission/retransmission of data. As shown in FIG. 2, a HARQ Tx 202, transmits a data packet 204 to a HARQ Rx 206. HARQ Tx 202 may encode data packet 204 prior to transmission, and HARQ Rx 206 may decode data packet 204. If an error is detected, the received packet data 204 may be discarded and HARQ Rx 206 may request a retransmission by transmitting NACK 208 to HARQ Tx 202. Upon receiving NACK 208, HARQ Tx 202 retransmits a data packet 204' to HARQ Rx 206. After data retransmission data packet 204' is properly received at HARQ Rx 206, HARQ Rx 206 may transmit ACK 210 to HARQ Tx 202, which can then transmit a new data packet 208 to HARQ Rx 206.

A multi-channel version of SAW mode HARQ, using a number N of parallel HARQ processes, may improve transmission efficiencies, for example by reducing control signal overhead. While awaiting the HARQ feedback packet (ACK/NACK) for previously transmitted packet data, other transmissions can be sent. In one variation, a HARQ process identifier, or HARQ process ID, is be included in the transmission so HARQ Rx 206 can identify the HARQ process corresponding to a received packet data.

Figure 3:
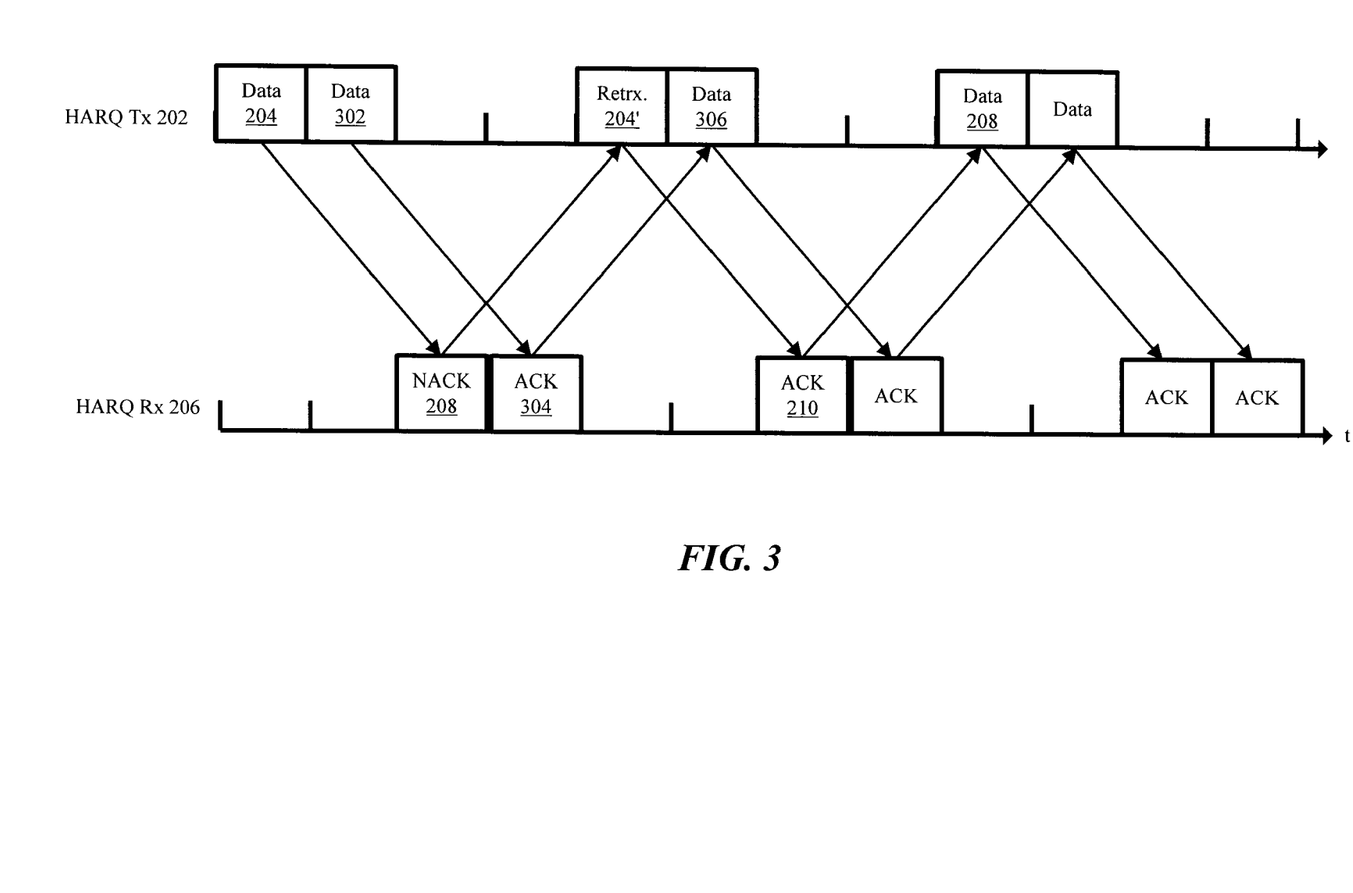
FIG. 3 is a signaling diagram illustrating a prior art transmission having multiple HARQ processes.

FIG. 3 is a signaling diagram illustrating a prior art transmission having multiple HARQ processes. As shown in FIG. 3, HARQ Tx 202 transmits a data packet 302 from a second HARQ process after data packet 204 is transmitted from a first HARQ process. HARQ Rx 206 transmits an ACK 304 to HARQ Tx 202 upon successful receipt of data packet 302. HARQ Tx 202 may then transmit a new data packet 306 to HARQ Rx 206.

In accordance with the Institute of Electrical and Electronics Engineers (IEEE) 802.16 family of standards, HARQ can be configured as synchronous or asynchronous with adaptive or non-adaptive modulation and may include coding schemes for different types of HARQ processing, such as chase combining or incremental redundancy operation. When synchronous HARQ is implemented, HARQ transmissions/retransmissions may be transmitted only at predetermined times. In a FDD system, due to the continuous uplink and downlink transmissions over separate channels, synchronous HARQ can be implemented by using the same Round Trip Time (RTT). The HARQ process corresponding to a particular data packet or HARQ feedback packet can be determined using a feedback time slot. In a TDD system, multiple data packets or HARQ feedback packets may be received at a single time slot so a feedback time slot alone may not be sufficient for determining a HARQ process ID.

The disclosed embodiments are directed to overcoming one or more of the problems set forth above.

SUMMARY OF THE INVENTION

In one aspect, the present disclosure is directed to a method of operating synchronous Hybrid Automatic Repeat Request (HARQ) between a transmitting station and a receiving station in a Time-Division Duplex (TDD) communication system. The method configures, at the transmitting station, a plurality of HARQ processes. The method transmits data packets to the receiving station using the plurality of HARQ processes, wherein the data packets do not include HARQ process identification information. In addition, the method receives, from the receiving station, a plurality of HARQ feedback packets indicative of whether the data packets were correctly received at the receiving station, wherein the plurality of HARQ feedback packets do not include HARQ process identification information and wherein the plurality of HARQ feedback packets are received in a downlink slot. The method also maps, by the transmitting station, the plurality of HARQ feedback packets to the plurality of HARQ processes.

In another aspect, the present disclosure is directed to a method of operating synchronous Hybrid Automatic Repeat Request (HARQ) between a transmitting station and a receiving station in a Time-Division Duplex (TDD) communication system. The method receives, from the transmitting station, data packets from a plurality of HARQ processes at the receiving station, wherein the data packets do not include HARQ process identification information, and generates, by the receiving station, HARQ feedback packets indicative of whether the data packets were correctly received at the receiving station, wherein the HARQ feedback packets do not include HARQ process identification information. The method also transmits, by the receiving station, the HARQ feedback packets at a predefined time without transmitting HARQ process identification information.

In another aspect, the present disclosure is directed to a method of configuring Hybrid Automatic Repeat Request (HARQ) processes at a transmitting station to be used in a Time-Division Duplex (TDD) communication system having a receiving station. The method determines a feedback downlink time slot $F_i$, wherein the feedback downlink time slot $F_i$ is a time slot at which the receiving station provides HARQ feedback data corresponding to a data packet transmitted by the transmitting station to the receiving station at an uplink time slot i using a HARQ process. The method determines a transmission time slot $T_i$, wherein the transmission time slot $T_i$ is a time slot at which an additional data transmission is transmitted by the transmitting station using the HARQ process, and the method determines a number of uplink time slots $N_i$ between the uplink time slot i and a time slot immediately preceding transmission time slot $T_i$. In addition, the method configures a number of HARQ processes N to be a maximum value of $N_i$ in a range of i from 1 to a, wherein a denotes a number of time slots for uplink within a frame.

In another aspect, the present disclosure is directed to a wireless communication station for wireless communication in a Time-Division Duplex (TDD) communication system. The wireless communication station includes at least one memory to store data and instructions and at least one processor configured to access the memory. The at least one processor is further configured to, when executing the instructions, configure a plurality of HARQ processes. In addition, the at least one processor is further configured to transmit data packets using the plurality of HARQ processes, wherein the data packets do not include HARQ process identification information, and receive a plurality of HARQ feedback packets indicative of whether the data packets were correctly received, wherein the plurality of HARQ feedback packets do not include HARQ process identification information and wherein the plurality of HARQ feedback packets are received in a downlink slot. The at least one processor is further configured to map the HARQ feedback packets to the plurality of HARQ processes.

In another aspect, the present disclosure is directed to a wireless communication station for wireless communication in a Time-Division Duplex (TDD) communication system. The wireless communication station includes at least one memory to store data and instructions and at least one processor configured to access the memory. The at least one processor is further configured to, when executing the instructions, receive data packets from a plurality of HARQ processes, wherein the data packets do not include HARQ process identification information. The at least one processor is further configured to, when executing the instructions, generate HARQ feedback packets indicative of whether the data packets were correctly received, wherein the HARQ feedback packets do not include HARQ process identification information, and transmit the HARQ feedback packets at a predefined time without transmitting HARQ process identification information.

In another aspect, the present disclosure is directed to a transmitting station to be used in a Time-Division Duplex (TDD) communication system having a receiving station. The transmitting station includes at least one memory to store data and instructions and at least one processor configured to access the memory. The at least one processor is further configured to, when executing the instructions, determine a feedback downlink time slot $F_i$, wherein the feedback downlink time slot $F_i$ is a time slot at which the receiving station provides HARQ feedback data corresponding to a data packet transmitted by the transmitting station using a Hybrid Automatic Repeat Request (HARQ) process to the receiving station at an uplink time slot i. The at least one processor is further configured to, when executing the instructions, determine a transmission time slot $T_i$, wherein the transmission time slot $T_i$ is a time slot at which an additional data transmission is transmitted by the transmitting station using the HARQ process and determine a number of uplink time slots $N_i$ between the uplink time slot i and a time slot immediately preceding transmission time slot $T_i$. In addition, the at least one processor is further configured to, when executing the instructions, configure a number of HARQ processes N to be a maximum value of $N_i$ in a range of i from 1 to a, wherein a denotes a number of time slots for uplink within a frame.

DETAILED DESCRIPTION

By providing a method and system for mapping HARQ feedback packets to a HARQ process to which the HARQ feedback packets are responsive, a HARQ receiver and HARQ transmitter may utilize synchronous HARQ in a TDD communication system. A base station (BS) may include a HARQ Rx and a subscriber station (SS) may include a HARQ Tx. Alternately, a HARQ Rx may reside in a SS and a HARQ Tx may reside in a BS. A receiving station receives data packets from a transmitting station and replies feedback packets to the transmitting station. A transmitting station is a station that transmits data packets to a receiving station and receives feedback packets from a receiving station.

Figure 4:
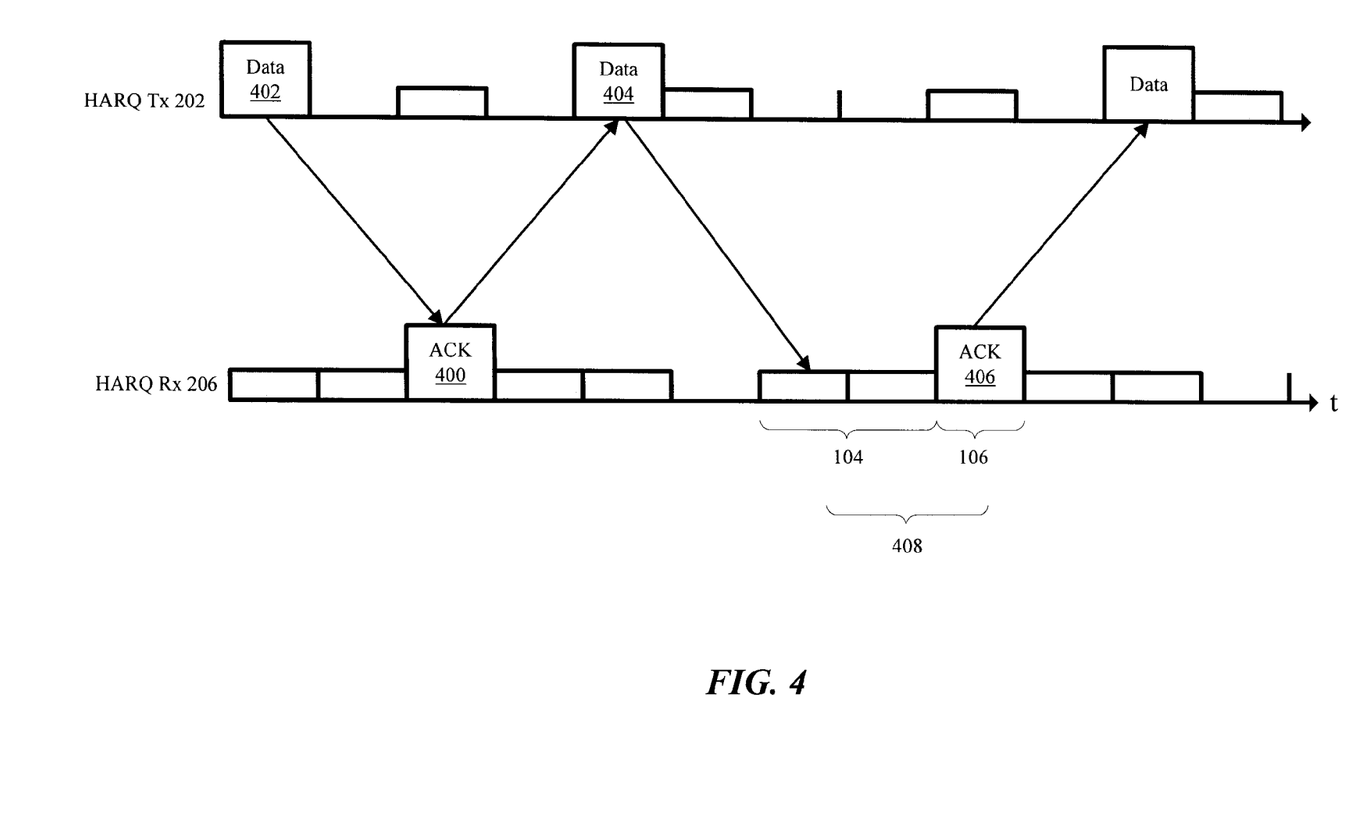
FIG. 4 is a signaling diagram of synchronous HARQ in a TDD communication system.

FIG. 4 is a signaling diagram of synchronous HARQ in a TDD communication system. Due to the restrictions on uplink and downlink times, the downlink nodes and uplink nodes are forced to delay their HARQ transmissions until the appropriate uplink or downlink subframes. For example, after receiving an ACK 400 from HARQ Rx 206 in response to the transmission of a data packet 402, HARQ Tx transmits a data packet 404. However, HARQ Rx 206 cannot transmit an ACK 406 back to HARQ Tx 202 until downlink subframe 106, and thus, after processing data packet 404 to determine if it was properly received, HARQ Rx 206 is forced to wait for a delay 408. As a result, a single downlink time slot may contain multiple ACKs and/or NACKs corresponding to multiple HARQ processes.

In some embodiments, when performing synchronous HARQ in TDD for a plurality of HARQ processes, the HARQ feedback packets (ACK/NACK) for multiple data packets corresponding to a plurality of HARQ processes may need to be sent during a single downlink. This could be due to, for example, discrepancies in size of downlink subframe 106 and uplink subframe 104 or processing times at HARQ Tx and HARQ Rx.

Figure 5:
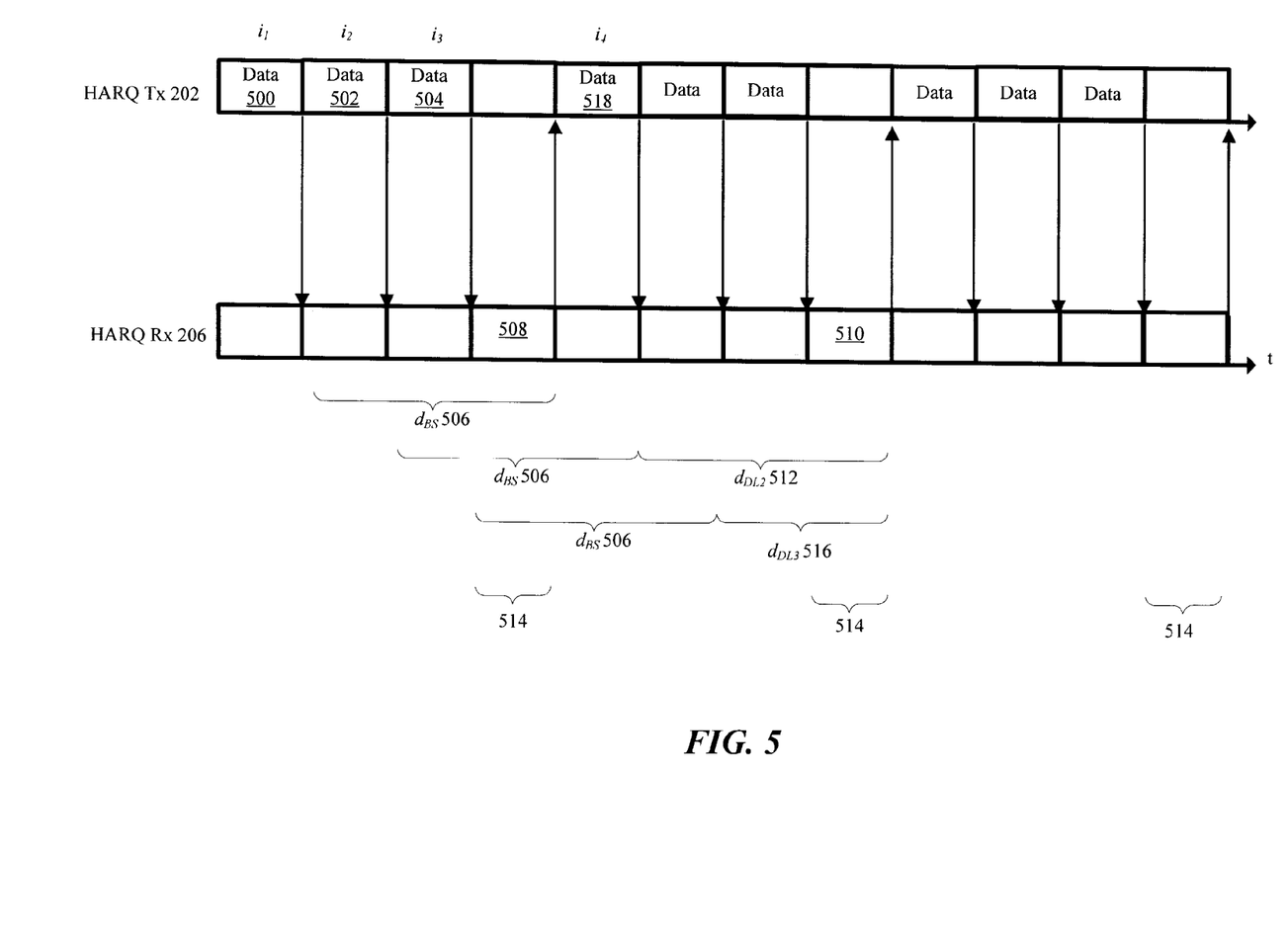
FIG. 5 is a signaling diagram of synchronous HARQ for a plurality of HARQ processes in a TDD system.

For example, FIG. 5 is a signaling diagram of synchronous HARQ for a plurality of HARQ processes in a TDD system. Using the plurality of HARQ processes, HARQ Tx 202 may transmit data packets 500, 502, and 504 during uplink time slots $i_1$, $i_2$, and $i_3$, respectively. Upon receiving data packet 502, HARQ Rx 206 may process data packet 502 to determine if there was an error in this transmission. In one embodiment, a base station time delay $d_{BS}$ 506 is the delay for processing a data packet at HARQ Rx 206. Feedback 508 may then be transmitted, for example, by HARQ RX 206, to HARQ Tx 202. Feedback 508 includes only the HARQ feedback packet (ACK/NACK) corresponding to data packet 500 transmitted at uplink time slot $i_1$ due at least in part to the length of base station time delay $d_{BS}$ 506. After processing data packet 502, during base station time delay $d_{BS}$ 506, HARQ Rx 206 waits additional downlink delay $d_{DL2}$ 512 until a downlink subframe 514, when HARQ Rx 206 can transmit feedback 510 including a HARQ feedback packet corresponding to data packet 502. Similarly, after processing data packet 504 during base station time delay $d_{BS}$ 506, HARQ Rx 206 waits an additional downlink delay $d_{DL3}$ 516 until downlink subframe 514, when HARQ Rx 206 can transmit feedback 510 including a HARQ feedback packet corresponding to data packet 504. In one embodiment, feedback 510 may also include a HARQ feedback packet corresponding to a data packet 518 transmitted at uplink time slot $i_4$. Although not shown in FIG. 5, in some frame structures, a processing delay for HARQ feedback packets at the downlink node, e.g., subscriber station time delay $d_{SS}$, can take place until the downlink node is able to transmit or retransmit data packets during the next available uplink time slot.

Feedback received during a single uplink slot therefore may include ACK/NACKs for more than one HARQ process and for more than one data packet. In one embodiment, therefore, feedback 510 received at HARQ Tx 202 may include an ACK/NACK corresponding to data packets 502, 504, and/or 518.

Conventional synchronous TDD systems using a plurality of HARQ processes include explicit signaling of HARQ process identification information, or HARQ process ID, along with the HARQ feedback packet to enable wireless communication stations such as an uplink node and downlink node to determine the HARQ process and/or data packet corresponding to a particular HARQ feedback packet sent simultaneously with other HARQ feedback packets. The inclusion of HARQ process ID, however, increases signaling overhead, thereby decreasing overall system efficiency.

Figure 6A:
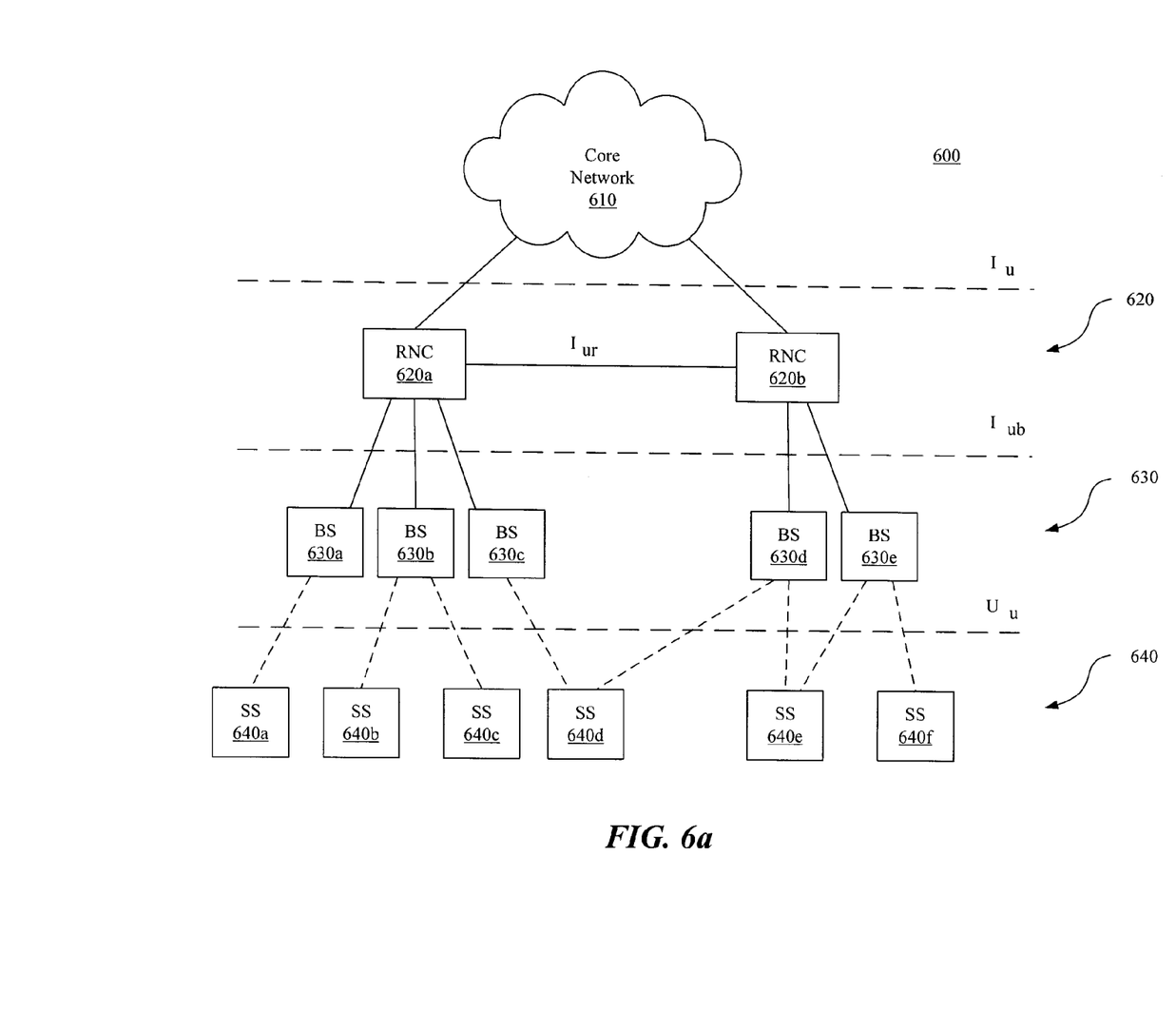
FIG. 6a is a block diagram of an exemplary wireless communication system.

FIG. 6a is a block diagram of an exemplary wireless communication system 600 in which embodiments consistent with the present invention may be practiced. In one embodiment, wireless communication system 600 is a UMTS system. As shown in FIG. 6a, exemplary wireless communication system 600 may include a Core Network (CN) 610, one or more Radio Network Controllers (RNC) 620, e.g., RNC 620a and RNC 620b, one or more Base Stations (BS) 630, e.g., BS 630a, BS 630b, BS 630c, BS 630d, and BS 630e, and one or more Subscriber Stations (SS) 640, e.g., SS 640a, SS 640b, SS 640c, SS 640d, SS 640e, and SS 640f. It should be noted that different terminologies and functionalities may be used in different wireless systems.

CN 610 may be a network or group of communication networks configured to provide communication services. CN 610 may provide, for example, switching, routing and transit for user traffic. In addition, CN 610 may maintain databases and network management functions. In some embodiments, CN 610 may be based on the Global System for Mobile Communications (GSM) network architecture. CN 610 may include any combination of wired and/or wireless connections.

Each RNC 620 may be any type of communication device configured to operate in the exemplary wireless communication system 600, many such communication devices being known in the art. Each RNC 620 may be responsible for resource management, mobility management, encryption, etc., in a wireless communication system. In addition, each RNC 620 may be responsible for control of one or more BSs 630. Although not shown, one or more of RNCs 620 may be connected to CN 610 through one or more gateway devices and the like.

Each RNC 620 may include one or more of the following components: a central processing unit (CPU) configured to execute computer program instructions to perform various processes and methods, random access memory (RAM) and read only memory (ROM) configured to access and store information and computer program instructions, a memory to store data and information, databases to store tables, lists, or other data structures, I/O devices, interfaces, antennas, etc. Each of these components is well-known in the art and will not be discussed further.

BS 630 may be any type of communication device configured to transmit and/or receive data and/or communications to and from one or more SSs 640 in a wireless communication system, many such communication devices being known in the art. In some embodiments, BS 630 may also be referred to as, for example, a Node-B, a base transceiver system (BTS), an access point, etc. Communication between BSs 630 and RNCs 620 may be any combination of wired and/or wireless connections. Communication between BSs 630 and SSs 640 may be wireless. In one exemplary embodiment, BS 630 may have a broadcast/reception range within which BS 630 may wirelessly communicate with one or more SSs 640. Broadcast ranges may vary due to power levels, location, and interference (physical, electrical, etc.).

Figure 6B:
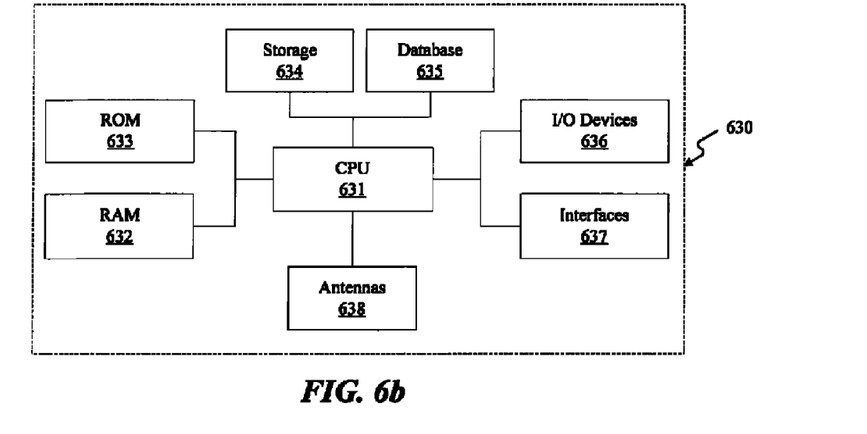
FIG. 6b is a block diagram illustrating an exemplary construction of a base station.

FIG. 6b is a block diagram illustrating an exemplary construction of BS 630. As shown in FIG. 6b, each BS 630 may include one or more of the following components: at least one central processing unit (CPU) 631 configured to execute computer program instructions to perform various processes and methods, random access memory (RAM) 632 and read only memory (ROM) 633 configured to access and store information and computer program instructions, memory 634 to store data and information, database 635 to store tables, lists, or other data structures, I/O devices 636, interfaces 637, antennas 638, etc. Each of these components is well-known in the art and will not be discussed further.

Referring to FIG. 6a, SS 640 may be any type of computing device configured to wirelessly transmit and/or receive data to and from one or more of BSs 630 in a wireless communication system. In certain exemplary environments, SS 640 may be a fixed antenna or mobile SS and may also be referred to as User Equipment (UE). SS 640 may include, for example, servers, clients, mainframes, desktop computers, laptop computers, network computers, workstations, personal digital assistants (PDA), tablet PCs, scanners, telephony devices, pagers, cameras, musical devices, etc. In one exemplary embodiment, SS 640 may be a mobile computing device.

Figure 6C:
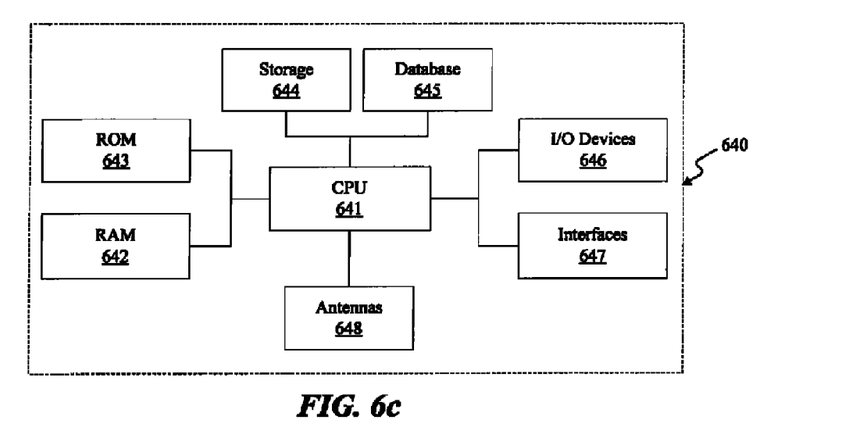
FIG. 6c is a block diagram illustrating an exemplary construction of a subscriber station.

FIG. 6c is a block diagram illustrating an exemplary construction of SS 640. As shown in FIG. 6c, each SS 640 may include one or more of the following components: at least one central processing unit (CPU) 641 configured to execute computer program instructions to perform various processes and methods, random access memory (RAM) 642 and read only memory (ROM) 643 configured to access and store information and computer program instructions, memory 644 to store data and information, database 645 to store tables, lists, or other data structures, I/O devices 646, interfaces 647, antennas 648, etc. Each of these components is well-known in the art and will not be discussed further.

Communication between the CN 610, RNCs 620, BSs 630, and SSs 640 maybe by means of logical connections. These logical connections may be referred to as interfaces. As shown in FIG. 6a, the logical connections between CN 610 and RNCs 620 may be referred to as Iu interfaces; the logical connections between RNCs 620 and one or more other RNCs 620 may be referred to as Iur interfaces; the logical connections between RNCs 620 and BSs 630 may be referred to as Iub interfaces; and the logical connections between BSs 630 and SSs 640 may be referred to as Uu interfaces. In one embodiment, the Iu, Iur, and Iub interfaces may be implemented using Asynchronous Transfer Mode (ATM). In one embodiment, the Uu interface may be implemented using W-CDMA.

Figure 7:
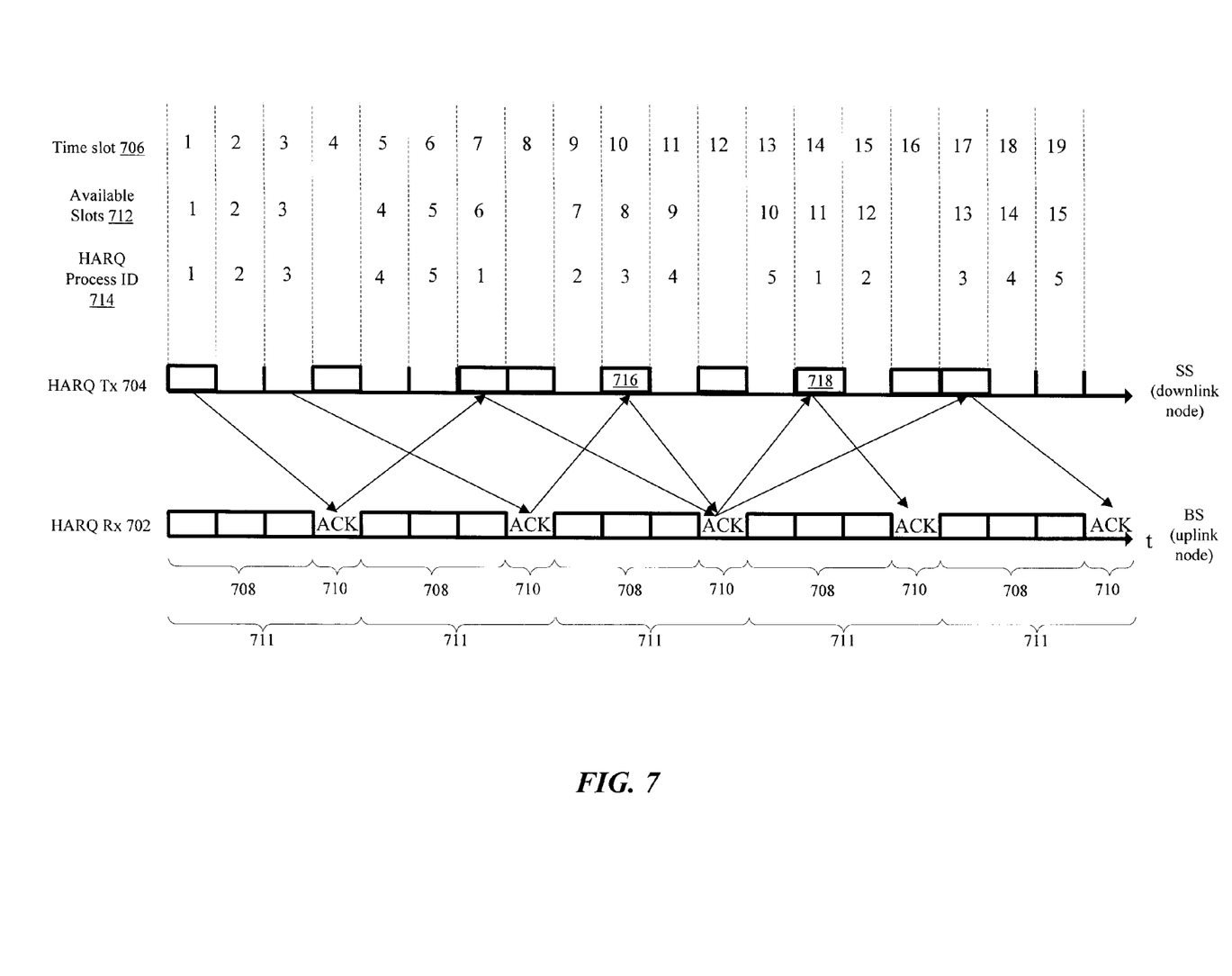
FIG. 7 is a signal diagram of an exemplary TDD synchronization scheme for use in a TDD frame structure, consistent with certain disclosed embodiments.

FIG. 7 is a signal diagram of an exemplary TDD synchronization scheme 700 for use in a TDD frame structure, consistent with certain disclosed embodiments. In the illustrated TDD synchronization scheme, an uplink node may have a HARQ Rx 702 and a downlink node may have a HARQ Tx 704. HARQ Rx 702 and HARQ Tx 704 may be any combination of software and/or hardware components configured to cause the transmitting and/or receiving devices to perform the functionality of the disclosed embodiments. For example and without limitation, the HARQ Rx 702 and HARQ Tx 704 may reside in MAC sub-layers of the transmission and receiver devices, respectively.

Transmission and reception of packets by HARQ Rx 702 and HARQ Tx 704 takes place in time slots 706. Time slots 706 include uplink time slots 708 and downlink time slots 710 which combine to form frames 711. The downlink node may be, for example, SS 640. The uplink node may be, for example, BS 630. Using exemplary TDD synchronization scheme 700, a HARQ process ID may be selected if an available uplink time slot number and a maximum number of HARQ processes are known. As shown in FIG. 7, in exemplary TDD synchronization scheme 700, not all time slots 706 may be used for uplink transmission. Rather, those time slots 706 which may be used for uplink transmissions such as uplink time slots 708 may be available time slots 712. As shown in FIG. 7, a plurality of HARQ processes, each given a respective HARQ process ID 714, are performed in rotation in available time slots 712. In one embodiment, HARQ Tx 704 can determine the HARQ process ID 714 corresponding to a transmitted data packet according to the following equation (1):

$$\text{HARQ Process ID} = \text{Available\_Time\_Slot\_Number} \bmod \text{Maximum\_Number\_of\_HARQ\_Processes} \quad (1)$$

In exemplary scheme 700 shown in FIG. 7, the maximum number of HARQ processes is set to five. A data packet 716 is transmitted at time slot 706 number 10, which corresponds to available time slot 712 number 8. HARQ Process ID 714 for data packet 716 is determined to be 3 using the above equation (1), because 8 mod 5=3. Similarly HARQ Process ID 714 for data packet 718, which is transmitted at available time slot 11 is 1 because 11 mod 5=1.

In other embodiments, an exemplary TDD synchronization scheme may be used wherein the HARQ Process ID 714 is associated with a particular position within frame 711, and the number of HARQ processes is selected to match a multiple of the size of the frame 711, which varies depending on the number of uplink time slots 708 and downlink time slots 710. In such a system, the HARQ process ID 714 may be determined according to the following equation (2):

$$\text{HARQ Process ID} = \text{Time\_Slot\_Number mod Maximum\_Number\_of\_HARQ\_Processes} \quad (2)$$

According to certain embodiments, a preferred number of HARQ processes to be configured in a transmitting station such as HARQ Tx 704 may be determined. Increasing the number of parallel HARQ processes may increase the buffering requirements and uplink signaling requirements and may result in long Round Trip Time (RTT). Long RTT may lead to false selection of a Modulation and Coding Scheme (MCS), which will result in erroneous packet reception. As such, adaptive modulation and coding (AMC) may fail due to long RTT when the number of HARQ processes is increased. Moreover, when a Frame Check Sequence (FCS) is applied, HARQ state information may need to be communicated to a new BS. In order to minimize signaling load in the uplink, the preferred number of HARQ processes may be limited. However, the number of HARQ processes to be configured should be large enough such that all HARQ processes have enough time to process data. If too few HARQ processes are used, uplink time slots may be wasted while the HARQ processes await HARQ feedback packets for their previously transmitted packet data.

Figure 8:
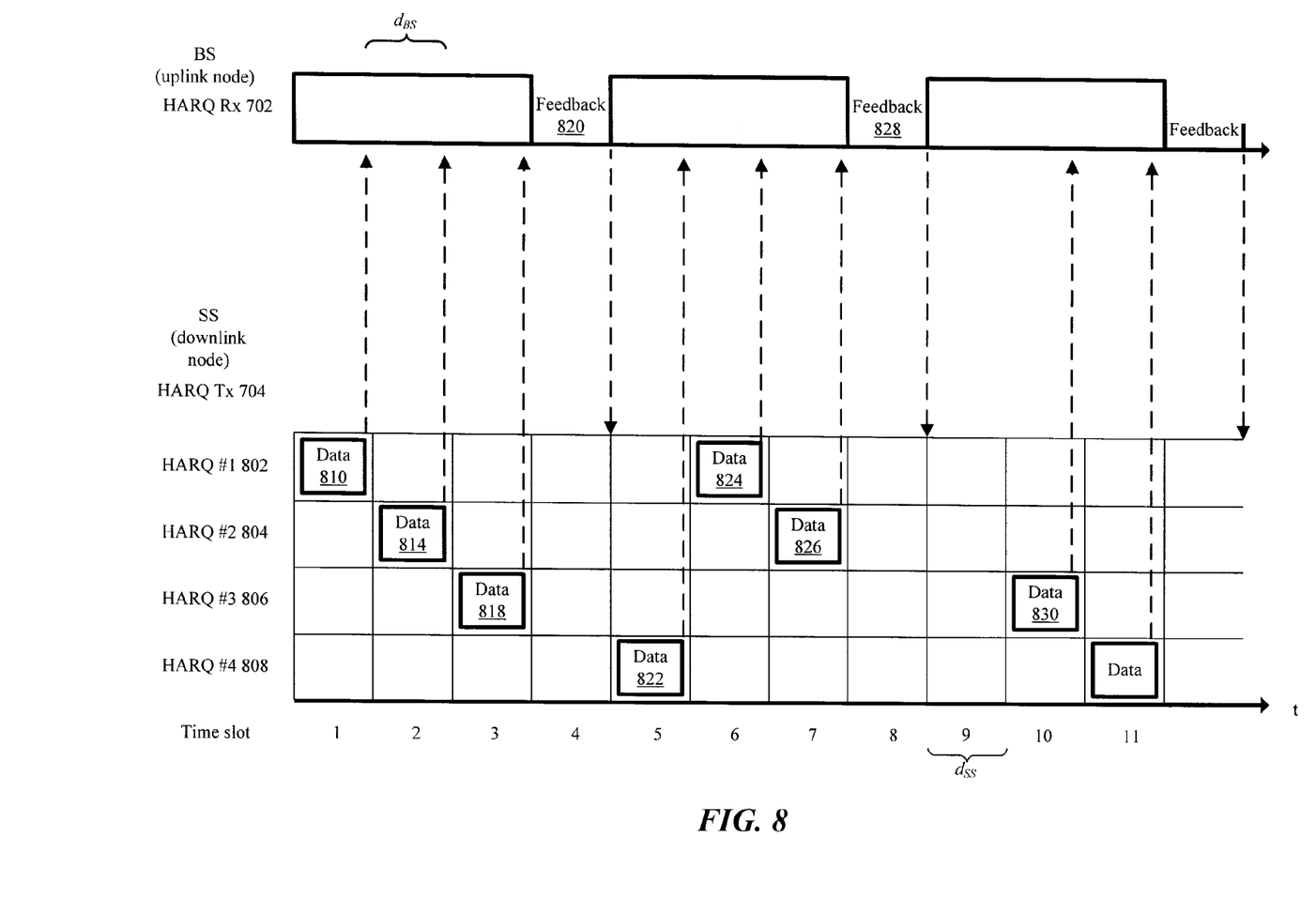
FIG. 8 is a signaling diagram of an exemplary TDD synchronization scheme for use in a TDD frame structure, consistent with certain disclosed embodiments.

FIG. 8 is a signaling diagram of an exemplary TDD synchronization scheme for use in a TDD frame structure, consistent with certain disclosed embodiments. For example, as shown in FIG. 8, HARQ Tx 704 may configure a first HARQ process 802, a second HARQ process 804, a third HARQ process 806, and a fourth HARQ process 808. As shown, a base station time delay $d_{BS}$ for processing a data packet, and a subscriber station time delay $d_{SS}$ for processing HARQ feedback data are both one Transmission Time Interval (TTI). In other embodiments, more or fewer processing TTIs may be used for one or more of base station time delay dBs and subscriber station time delay $d_{SS}$.

As shown in FIG. 8, each of HARQ processes 802, 804, 806, and 808 at HARQ Tx 704, e.g., a SS, transmits a data packet to HARQ Rx 702, which may receive all or parts of the data packets and may transmit HARQ feedback packets or data responsive to the data packets indicative of whether the data packets were properly and/or erroneously received. HARQ processes 802, 804, 806, and 808 are SAW HARQ processes and are configured to operate sequentially. For example, second HARQ process 804 follows first HARQ process 802 in the transmission of data packets and receipt of HARQ feedback packets, third HARQ process 806 follows second HARQ process 804, and fourth HARQ process 808 follows third HARQ process 806.

For example, as shown in FIG. 8, at time slot 1, first HARQ process 802 may transmit a data packet 810 to HARQ Rx 702. While HARQ Rx 702 processes data packet 810 for time period $d_{BS}$ at time slot 2, second HARQ process 804 may transmit a data packet 814 to HARQ Rx 702. At time slot 3, third HARQ process 806 may transmit a data packet 818 to HARQ Rx 702 while HARQ Rx 702 processes data packet 814.

At time slot 4, HARQ Rx 702 transmits feedback 820 to HARQ Tx 704. Feedback 820 includes HARQ feedback packets for those data packets HARQ Rx 702 has processed as of time slot 4 given base station time delay $d_{BS}$, namely, data packets 810 and 814. In accordance with one embodiment, feedback 820 may be in the form of a bitmap or other data structure which includes one or more HARQ feedback packet. In one embodiment, HARQ Rx 702 may continue to process data packet 818 during the same time slot as its transmission of feedback 820.

Processing of data packets by HARQ Rx 702 and processing of feedback 820 by HARQ Tx 704 continues for time slots 4 through 8. Specifically, at time slots 5, 6, and 7, data packets 822, 824, and 826 are transmitted, respectively, by HARQ processes 808, 802, and 804. In one embodiment, no data packet is processed during time slot 5, and data packets 822 and 824 are processed at time slots 6 and 7, respectively. At time slot 8, HARQ Rx 702 transmits feedback 828 to HARQ Tx 704. Feedback 828 includes HARQ feedback packets for data packets 818, 822, and 824. Meanwhile, HARQ Rx 702 may continue to process data packet 826.

At time slot 9, no data packet can be sent by HARQ Tx 704, because third HARQ process 806 is next in line to transmit a data packet, but third HARQ process 806, having just received feedback for data packet 818, has not yet had time to process the feedback to determine whether it must retransmit data packet 818 or transmit a new data packet. As such, in some embodiments, HARQ Tx 704 does not transmit a data packet during certain time slots. For example, as shown in FIG. 8, no data packet is transmitted at time slot 9, as third HARQ process 806 processes the HARQ feedback packet for data packet 818 for the duration of subscriber station delay $d_{ss}$. Transmission of data packet 830 by third HARQ process 806 may take place at time slot 10. Wasted transmission slots may therefore occur when there are too few HARQ processes for the frame structure implemented and the base station time delay $d_{BS}$ and subscriber station time delay $d_{SS}$ required by a system. To avoid this inefficiency, in some embodiments, a preferred number of HARQ processes N is calculated which is designed to be large enough to minimize and/or eliminate wasted transmission time slots.

Figure 9:
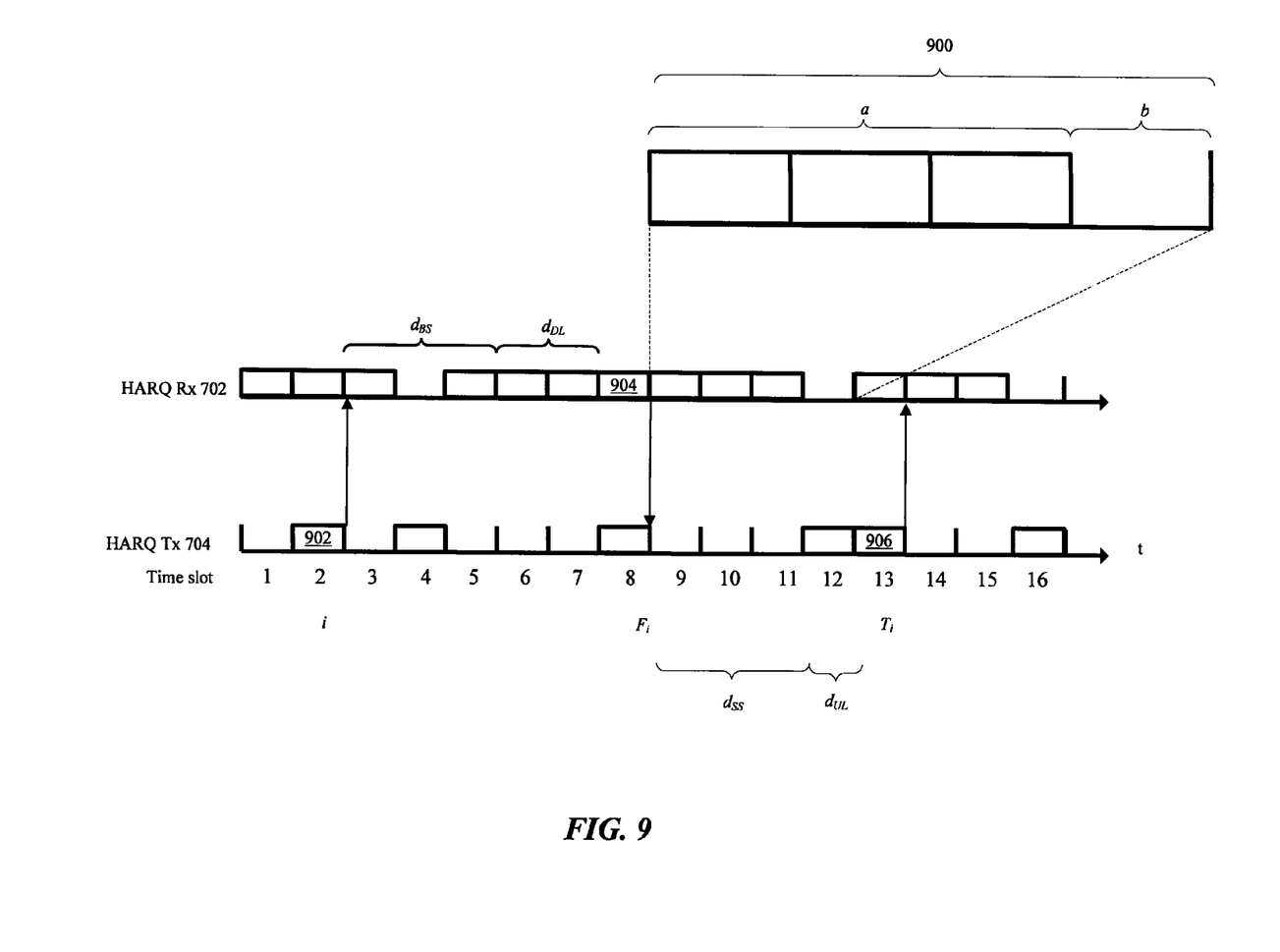
FIG. 9 is a signaling diagram of a system implementing an exemplary algorithm for determining a number of HARQ processes to be configured by a subscriber station and used in a wireless communication system, consistent with certain disclosed embodiments.

FIG. 9 is a signaling diagram of a system implementing an exemplary algorithm for determining a number of HARQ processes to be configured by a subscriber station and used in a wireless communication system, consistent with certain disclosed embodiments. For use in one embodiment, a is a number of time slots for uplink within a frame 900, b is a number of time slots for downlink within frame 900. For example, as shown in FIG. 9, a is 3 and b is 1. Using the exemplary algorithm a feedback downlink time slot $F_i$, a transmission time slot $T_i$, and a number of uplink time slots $N_i$ can be determined and a transmitting station can determine an optimal quantity N of HARQ processes to be configured.

A data packet 902, transmitted at uplink time slot i, may be processed by HARQ Rx 702 during base station time delay $d_{BS}$. Data packet 902 may thus be processed until a time slot equal to $i+d_{BS}$. If the next slot, $i+d_{BS}+1$, is a downlink slot, an associated feedback 904 is replied to HARQ Tx 704 at that slot. Otherwise, HARQ Rx 702 will wait an additional downlink delay $d_{DL}$ until it may transmit associated feedback 904. As shown in FIG. 9, for example, base station time delay $d_{BS}$ is 3 TTI, and because the next time slot after time i+3 is not a downlink slot, HARQ Rx 702 waits for additional downlink delay $d_{DL}$ until the next available downlink time slot before it can transmit associated feedback 904.

Feedback downlink time slot $F_i$ is the time slot where associated feedback 904 for data packet 902 transmitted at uplink time slot i is transmitted by HARQ Rx 702 back to HARQ Tx 704. In one embodiment, the position of uplink time slot i within a frame may be calculated as i mod (a+b). In accordance with one exemplary embodiment, the following equation (3) may be used to determine additional downlink delay $d_{DL}$:

$$d_{DL}=a-(i+d_{BS})\bmod(a+b) \quad (3)$$

For example, as shown in FIG. 9, $d_{DL(i=2)}=2$.

In accordance with one exemplary embodiment, feedback downlink time slot $F_i$ for uplink time slot i may be determined according to the following equation (4):

$$F_i=\max\{i+d_{BS}+1, i+d_{BS}+(a-(i+d_{BS})\bmod(a+b))+1\} \quad (4)$$

For example, as shown in FIG. 9, $F_{i(i=2)}=\max\{6,8\}=8$.

After HARQ Tx 704 receives associated feedback 904 at time slot $F_i$, HARQ Tx 704 may process associated feedback until time slot $F_i+d_{SS}$. If the next slot after Fi+$d_{SS}$ is an uplink slot, additional data transmission 906 will occur. Otherwise, HARQ Tx 704 will wait an additional uplink delay $d_{UL}$ until it may transmit additional data transmission 906. For example, as shown in FIG. 9, because the next time slot after $F_i+3$ is not a uplink slot, HARQ Tx 704 waits additional uplink delay $d_{UL}$ before transmitting additional data transmission 906. In accordance with one exemplary embodiment, an equation may be used to determine additional uplink delay $d_{UL}$. Specifically, in one embodiment, additional uplink delay $d_{UL}$ may be calculated according to the following equation (5):

$$d_{UL}=b-(F_i+d_{SS}-a)\bmod(a+b) \quad (5)$$

For example, as shown in FIG. 9, $d_{UL(i=2)}=1-(8)\bmod(4)=1$.

Transmission time slot $T_i$ is a time slot at which additional data transmission 906 is transmitted by the SS using the same HARQ process that transmitted the data packet 902 at uplink time slot i. Additional data transmission 906 may be a new data packet if an ACK was received by the SS, or if a NACK was received, a data packet such as data packet 902 will be retransmitted at that time slot $T_i$. In accordance with one exemplary embodiment, an equation may be used to determine time slot $T_i$. Specifically, in one embodiment, transmission time slot $T_i$ may be determined according to the following equation (6):

$$T_i=\max\{F_i+d_{ss}+1, F_i+d_{ss}+(b-(F_i+d_{ss}-a)\bmod(a+b))+1\} \quad (6)$$

For example, as shown in FIG. 9, $T_{i(i=2)}=\max\{12,13\}=13$

In accordance with one exemplary embodiment, an equation may be used to determine a number of uplink time slots $N_i$ between uplink time slot i and a time slot immediately preceding transmission time slot $T_i$. Specifically, in one embodiment, the number of uplink time slots $N_i$ may be determined according to the following equation (7):

$$N_i = T_i - i - b \times \left(\left\lfloor\frac{T_i}{a+b}\right\rfloor - \left\lfloor\frac{i}{a+b}\right\rfloor\right) \quad (7)$$

For example, as shown in FIG. 9, $N_{i(i=2)}=8$. As shown, eight uplink time slots appear between uplink slot i and time slot 12: time slots 2, 3, 5, 6, 7, 9, 10, and 11.

In one exemplary embodiment, quantity N of HARQ processes to be configured by the SS can not be less than $N_i$ for all uplink time slots i. As discussed above, as the quantity N of HARQ processes increases, buffering, retransmission and signaling overhead may increase and errors may occur. However, too few HARQ processes will result in inefficiencies due to wasted time slots. Moreover, if uplink time slot i and uplink time slot j have the same position within frame 900, i.e., i mod (a+b)=j mod (a+b), then $N_i$ is equal to $N_j$. Thus, in one exemplary embodiment, an optimal quantity N of HARQ processes can be configured according to the following equation (8):

$$N=\max\{N_i, \text{ for all } i=1 \text{ to } a\} \quad (8)$$

Using an algorithm such as the exemplary algorithm including equations (8), (7), (6) and (4) above to determine one or more of N, $N_i$, $T_i$, and $F_i$, a HARQ Rx, e.g., a BS, can determine a quantity N of HARQ processes to be configured. In one embodiment, a HARQ Tx may use the exemplary algorithm to determine a quantity N of HARQ processes that have been or will be configured at a HARQ Tx.

Once the quantity N of HARQ processes is determined, HARQ Tx may then transmit data packets to HARQ Rx using the plurality of HARQ processes N. In one embodiment, the data packets do not include HARQ process identification information, also called HARQ process ID, and HARQ Rx, or BS, may receive, or attempt to receive, the data packets. In some embodiments, upon receipt of the data packets, HARQ Rx may determine the HARQ process ID for the data packets transmitted by the HARQ Tx.

In accordance with one exemplary embodiment, an equation may be used to determine a HARQ process ID for one or more data packets. Specifically, a HARQ process ID for data received at an uplink slot x may be determined according to the following equation (9):

$$\text{HARQ process } ID = \left(x - b \times \left\lfloor\frac{x}{a+b}\right\rfloor\right)\bmod N \quad (9)$$

As such, a HARQ Rx can determine a HARQ process ID when it receives a data packet from a HARQ Tx without receiving an explicit HARQ process ID. Thus, for an uplink HARQ transmission, a BS can determine a HARQ process ID corresponding to a received data packet without receiving an explicit HARQ process ID from an SS. Similarly, for a downlink HARQ transmission, an SS can determine a HARQ process ID corresponding to a received data packet without receiving an explicit HARQ process ID from a BS.

Figure 10:
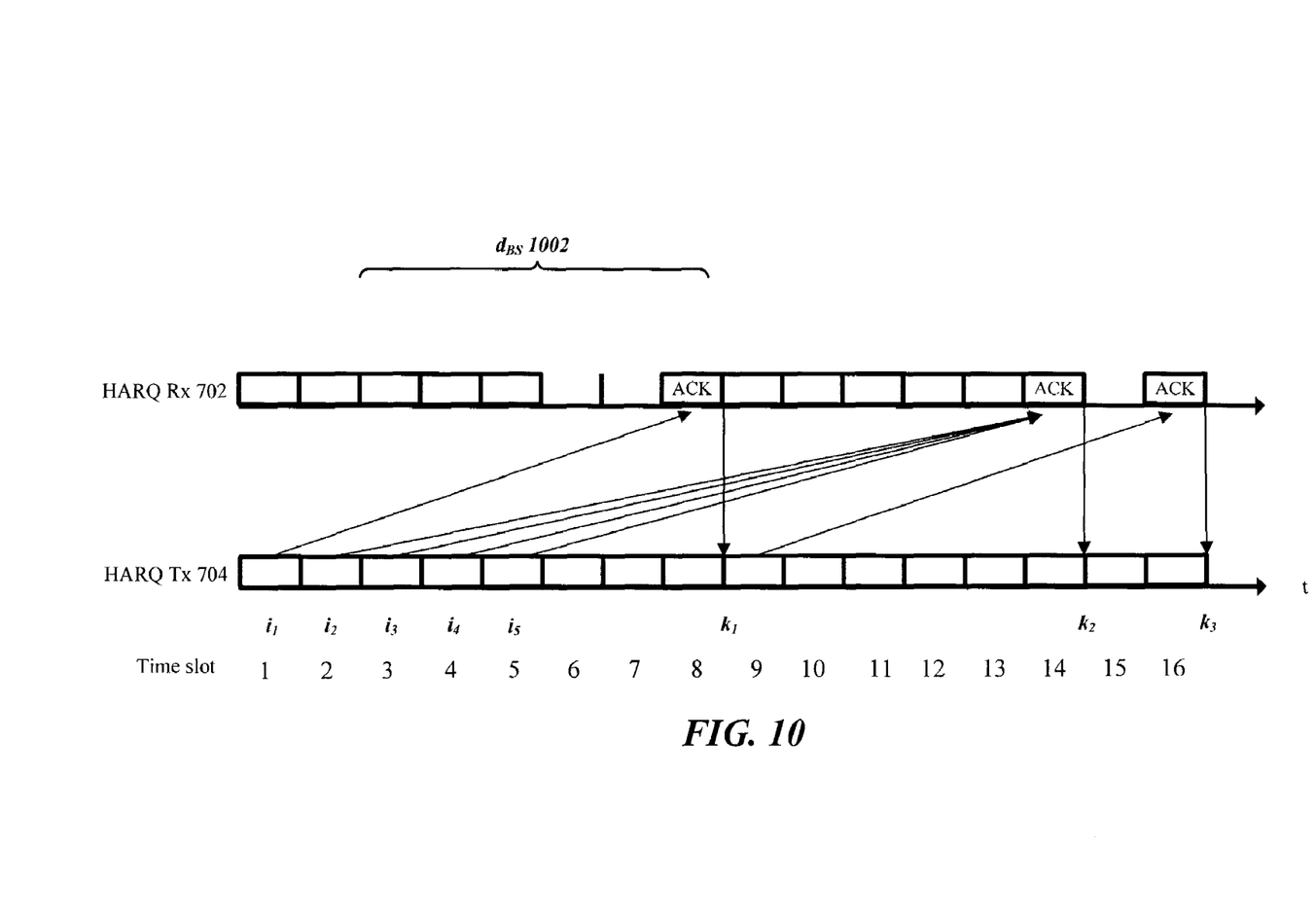
FIG. 10 is a signaling diagram of a system implementing an exemplary algorithm for determining a HARQ process corresponding to HARQ feedback data transmitted at a downlink slot.

FIG. 10 is a signaling diagram of a system implementing an exemplary algorithm for determining the HARQ process corresponding to HARQ feedback data transmitted at a downlink slot. In one embodiment, HARQ Rx 702 may create a bitmap of HARQ feedback packets indicative of whether the data packets were correctly received at the BS. In one embodiment, neither the bitmap nor the feedback packets include HARQ process identification information. HARQ Rx 702 may transmit the bitmap to HARQ Tx 704, which may receive the bitmap at, for example, downlink time slots k, which include downlink time slots $k_1$, $k_2$, and $k_3$.

In one exemplary embodiment HARQ Rx 702 and/or HARQ Tx 704 may map HARQ feedback packets transmitted at downlink slot k that correspond to data packets transmitted at uplink slots $S_k$. $S_k$ and k may be mapped according to the following equation (10):

if k mod (a+b)=a+1, $$S_k=\{i|\text{for all uplink time slots } i \text{ in range from } k-d_{bs}-a-1 \text{ to } k-d_{bs}-1\};$$

else $$S_k=\{\text{uplink time slot with number } k-d_{bs}-1\}. \quad (10)$$

The feedback packets corresponding to the set of uplink slots $S_k$ may be combined into a bitmap generated at HARQ Rx 702, and the generated bitmap may then be transmitted to HARQ Tx 704 at a predefined time such as downlink slot k. In one embodiment, uplink slots $S_k$ may be mapped into the bitmap in a predefined configuration. In one embodiment, the bitmap does not include HARQ process IDs. After receiving the bitmap, HARQ Tx 704 may determine the uplink slots $S_k$ by using exemplary equation (10).

As shown in the exemplary signal diagram of FIG. 10, a $d_{BS}$ 1002 is 6, a is 5, and b is 3. Thus, applying equation (10) for $k_1=8$, because 8 mod 8 is not equal to a+1 (=6), the feedback for uplink slots $S_k$ transmitted at downlink slots k, $S_k$ are $S_k=\{$uplink time slot 1$\}$. In another example applying equation (10), for $k_1=14$, because 14 mod 8 is equal to 6, the uplink slots $S_k$ are time slots in between 2 and 7, which includes uplink slots 2, 3, 4 and 5.

HARQ Rx 702 and HARQ Tx 704 may be any combination of software and/or hardware components configured to cause the transmitting and/or receiving devices to perform the functionality of the disclosed embodiments. In performing the above-described algorithm, HARQ Rx may utilize one or more of CPU 631, RAM 632, ROM 633, memory 634, I/O devices 636, antennas 638 of BS 630. HARQ Tx may utilize one or more of CPU 641, RAM 642, ROM 643, memory 644, I/O devices 646, antennas 648 of SS 640.

The disclosure primarily addresses uplink HARQ transmission where a receiving station is a base station and a transmitting station is a subscriber station. This arrangement generally corresponds to 3GPP LTE, in which HARQ is based on synchronous retransmissions in the uplink path and asynchronous retransmissions in the downlink path. However, one of skill in the art will now appreciate that the disclosure also pertains to downlink HARQ transmission where a transmitting station is a base station and a receiving station is a subscriber station.

It will be apparent to those skilled in the art that various modifications and variations can be made in the system and method for operating synchronous HARQ between a subscriber station and base station in a TDD system. It is intended that the standard and examples be considered as exemplary only, with a true scope of the disclosed embodiments being indicated by the following claims and their equivalents.

What is claimed is:

1. A method of configuring Hybrid Automatic Repeat Request (HARQ) processes at a transmitting station to be used in a Time-Division Duplex (TDD) communication system having a receiving station, comprising:
    determining a feedback downlink time slot $F_i$, wherein the feedback downlink time slot $F_i$ is a time slot at which the receiving station provides a HARQ feedback packet corresponding to a data packet transmitted by the transmitting station to the receiving station at an uplink time slot i using a HARQ process;
    determining a transmission time slot $T_i$, wherein the transmission time slot $T_i$ is an uplink time slot at which an additional data transmission is transmitted by the transmitting station using the HARQ process;
    determining a number of uplink time slots $N_i$ between the uplink time slot i and a time slot immediately preceding transmission time slot $T_i$, wherein the number of uplink time slots $N_i$ is determined by:

$$N_i = T_i - i - b \times \left(\left\lfloor \frac{T_i}{a+b} \right\rfloor - \left\lfloor \frac{i}{a+b} \right\rfloor\right);$$

wherein
    a is a number of time slots for uplink within a frame, and
    b is a number of time slots for downlink within a frame; and
    configuring a number of HARQ processes N to be a maximum value of the determined number of uplink time slots $N_i$ in a range of i from 1 to a, wherein a denotes a number of time slots for uplink within a frame.

2. The method of claim 1, wherein the transmitting station is a subscriber station (SS) and the receiving station is a base station (BS).

3. The method of claim 2, wherein the feedback downlink time slot $F_i$, for the data packet transmitted at uplink time slot i is determined by a relationship among the uplink time slot i, a base station time delay for processing the data packet at the BS, the number of time slots for uplink within a frame, and the number of time slots for downlink within a frame.

4. The method of claim 3, wherein the transmission time slot $T_i$ is determined by a relationship among the feedback downlink time slot $F_i$ for the data packet transmitted at the uplink time slot i, a subscriber station time delay for processing the HARQ feedback data at the SS, the number of time slots for uplink within a frame, and the number of time slots for downlink within a frame.

5. The method of claim 3, wherein the feedback downlink time slot $F_i$ is determined by:

$$F_i = \max\{i + d_{BS} + 1, i + d_{BS} + (a - (i + d_{BS}) \bmod (a+b)) + 1\}$$

wherein
    $d_{bs}$ is a base station time delay,
    a is a number of time slots for uplink within a frame, and
    b is a number of time slots for downlink within the frame.

6. The method of claim 4, wherein the transmission time slot $T_i$ is determined by:

$$T_i = \max\{F_i + d_{ss} + 1, F_i + d_{ss} + (b - (F_i + d_{ss} - a) \bmod (a+b)) + 1\}$$

wherein
    $d_{ss}$ is a subscriber station time delay,
    a is a number of time slots for uplink within a frame, and
    b is a number of time slots for downlink within a frame.

7. The method of claim 1, further comprising determining, by the receiving station, a HARQ process identifier for a selected one of the plurality of HARQ processes at the transmitting station that generated the data packet for data received at an uplink time slot x by a relationship among a number of time slots for uplink within a frame, a number of time slots for downlink within the frame, and a quantity of HARQ processes N configured at the transmitting station.

8. The method of claim 1, wherein the plurality of HARQ feedback packets for the plurality of HARQ processes are combined in a bitmap sequentially if the plurality of HARQ processes have a same feedback downlink time slot $F_i$.

9. The method of claim 8, wherein the bitmap is received in a downlink slot k and indicative of receipt status by the BS of data packets identified by uplink time slots $S_k$, $S_k$ being determined by:
    if k mod (a+b)=a+1,
        $S_k=\{i|$ for all uplink time slots i in range from $k-d_{bs}-a-1$ to $k-d_{bs}-1\}$;
    else
        $S_k=\{$uplink time slot with number $k-d_{bs}-1\}$
    wherein
    a is a number of time slots for uplink within a frame,
    b is a number of time slots for downlink within a frame; and
    $d_{bs}$ is a base station time delay.

10. A transmitting station to be used in a Time-Division Duplex (TDD) communication system having a receiving station, the transmitting station comprising:
    at least one memory to store data and instructions; and
    at least one processor configured to access the memory and configured to, when executing the instructions:
        determine a feedback downlink time slot $F_i$, wherein the feedback downlink time slot $F_i$ is a time slot at which the receiving station provides a HARQ feedback packet corresponding to a data packet transmitted by the transmitting station using a Hybrid Automatic Repeat Request (HARQ) process to the receiving station at an uplink time slot i;

determine a transmission time slot $T_i$, wherein the transmission time slot Ti is an uplink time slot at which an additional data transmission is transmitted by the transmitting station using the HARQ process;

determine a number of uplink time slots $N_i$ between the uplink time slot i and a time slot immediately preceding transmission time slot $T_i$, wherein the number of uplink time slots $N_i$ is determined by:

$$N_i = T_i - i - b \times \left( \left\lfloor \frac{T_i}{a+b} \right\rfloor - \left\lfloor \frac{i}{a+b} \right\rfloor \right);$$

wherein a is a number of time slots for uplink within a frame, and b is a number of time slots for downlink within a frame; and configure a number of HARQ processes N to be a maximum value of the determined number of uplink time slots $N_i$, in a range of i from 1 to a, wherein a denotes a number of time slots for uplink within a frame.

11. The transmitting station of claim 10, wherein the transmitting station is a subscriber station (SS) and wherein the feedback downlink time slot $F_i$ for the data packet transmitted at uplink time slot i is determined by a relationship among the uplink time slot i, a base station time delay for processing the data packet at a base station, the number of time slots for uplink within a frame, and the number of time slots for downlink within a frame.

12. The transmitting station of claim 10, wherein the transmitting station is a subscriber station (SS) and wherein the transmission time slot $T_i$ is determined by a relationship among the feedback downlink time slot $F_i$ for the data packet transmitted at the uplink time slot i, a subscriber station time delay for processing the HARQ feedback data at the SS, the number of time slots for uplink within a frame, and the number of time slots for downlink within a frame.

* * * * *